United States Patent
Kitano

(10) Patent No.: US 11,634,176 B2
(45) Date of Patent: Apr. 25, 2023

(54) TRAVELING ROUTE GENERATION DEVICE AND VEHICLE CONTROL DEVICE

(71) Applicant: Mitsubishi Electric Corporation, Tokyo (JP)

(72) Inventor: Hiroaki Kitano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 326 days.

(21) Appl. No.: 17/265,520

(22) PCT Filed: Sep. 26, 2018

(86) PCT No.: PCT/JP2018/035550
§ 371 (c)(1),
(2) Date: Feb. 3, 2021

(87) PCT Pub. No.: WO2020/065745
PCT Pub. Date: Apr. 2, 2020

(65) Prior Publication Data
US 2021/0300470 A1    Sep. 30, 2021

(51) Int. Cl.
*B62D 15/02* (2006.01)
*G05D 1/02* (2020.01)
(Continued)

(52) U.S. Cl.
CPC ......... *B62D 15/025* (2013.01); *G05D 1/0212* (2013.01); *G08G 1/0968* (2013.01); *G05D 2201/0213* (2013.01)

(58) Field of Classification Search
CPC ............... B62D 15/025; G05D 1/0212; G05D 2201/0213; G08G 1/0968
See application file for complete search history.

(56) References Cited

U.S. PATENT DOCUMENTS

| | | |
|---|---|---|
| 2014/0200768 A1 | 7/2014 | Tsuruta et al. |
| 2017/0270373 A1 | 9/2017 | Kawasaki et al. |
| 2018/0099667 A1* | 4/2018 | Abe ............ G08G 1/167 |

FOREIGN PATENT DOCUMENTS

| | | |
|---|---|---|
| JP | 2005-140749 A | 6/2005 |
| JP | 2010-202139 A | 9/2010 |

(Continued)

OTHER PUBLICATIONS

International Search Report and Written Opinion dated Jan. 8, 2019, received for PCT Application PCT/JP2018/035550, Filed on Sep. 26, 2018, 7 pages including English Translation.

(Continued)

*Primary Examiner* — Rodney A Butler
(74) *Attorney, Agent, or Firm* — Xsensus LLP

(57) ABSTRACT

An object of the present invention is to provide a traveling route generation device and a vehicle control device. A traveling route generation device according to the present invention includes: a travel region information acquisition unit acquiring travel region information; and a traveling route generation unit generating information of a curved line expressing a route along which the vehicle should proceed based on the travel region information, wherein an output of the traveling route generation unit is supplied to a vehicle controller performing steering control of the vehicle, and the traveling route generation unit increases weight of the travel region information in a range used for the steering control in the travel region information to be larger than weight of the travel region information in a range which is not used for the steering control to generate information of the curved line.

9 Claims, 18 Drawing Sheets

(51) Int. Cl.
   *G08G 1/09*    (2006.01)
   *G08G 1/0968*  (2006.01)

(56) References Cited

FOREIGN PATENT DOCUMENTS

| JP | 2014-135016 A  | 7/2014  |
|----|----------------|---------|
| JP | 2016-43837 A   | 4/2016  |
| JP | 2017-134724 A  | 8/2017  |
| JP | 2017-224168 A  | 12/2017 |
| WO | 2018/134863 A1 | 7/2018  |

OTHER PUBLICATIONS

Notice of Reasons of Refusal dated Jun. 4, 2019, received for JP Application 2019-510723, 11 pages including English Translation.

* cited by examiner

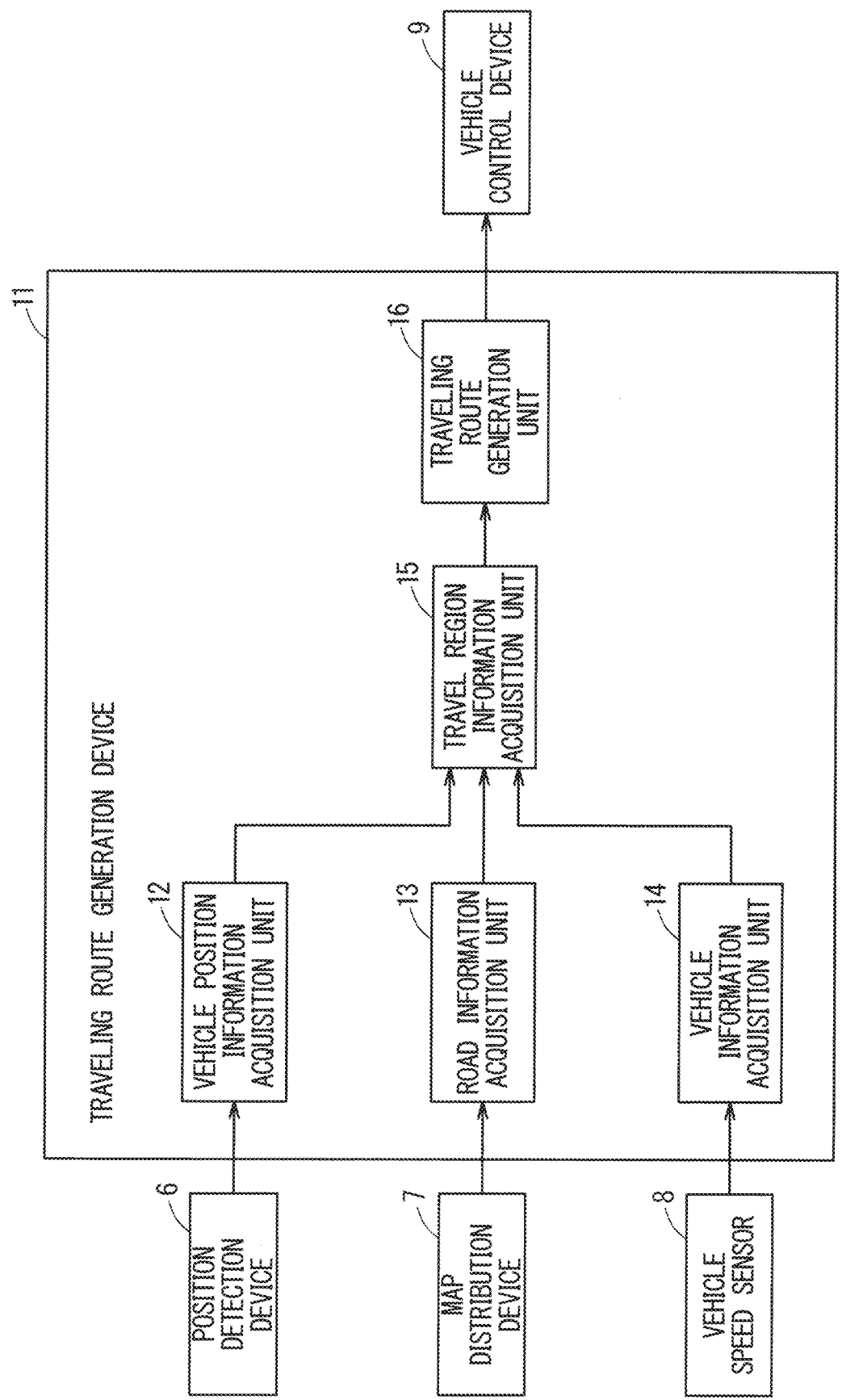
F I G. 2

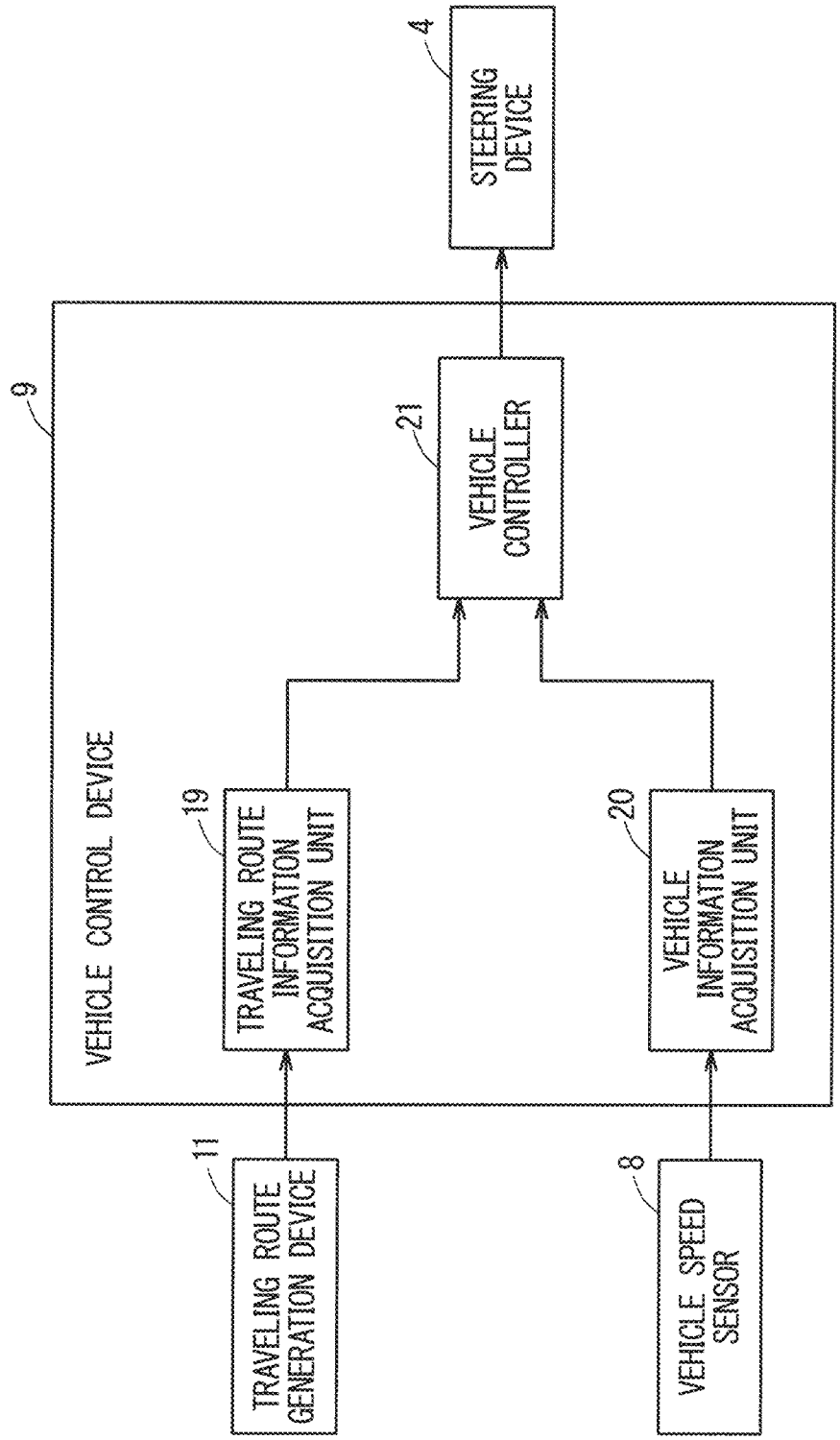
F I G. 4

TRAVELING ROUTE GENERATION DEVICE AND VEHICLE CONTROL DEVICE

CROSS-REFERENCE TO RELATED APPLICATION

The present application is based on PCT filing PCT/JP2018/035550, filed Sep. 26, 2018, the entire contents of which are incorporated herein by reference.

TECHNICAL FIELD

The present invention relates to a traveling route generation device generating a traveling route along which a vehicle travels and a vehicle control device performing traveling control of the vehicle so that the vehicle travels along the traveling route generated by the traveling route generation device.

BACKGROUND ART

It is necessary to detect a road on which a vehicle should travel or a region where a vehicle can travel, generate a traveling route which is a route along which the vehicle should travel, and control the vehicle so that the vehicle travels along the generated traveling route in order to perform a drive assist of the vehicle or automatic traveling of the vehicle. When not only a positional error of the traveling route and the vehicle but also information of an angle error of the traveling route and the vehicle and a curvature, for example, are used, the vehicle can be made to travel along the traveling route more smoothly in order to control the vehicle so that the vehicle travels along the generated traveling route.

However, when the traveling route is required in a discretized dot sequence, a smooth traveling route cannot be acquired due to a variation in accuracy of such a traveling route, and a problem of decrease in comfortableness in riding a vehicle occurs in some cases.

Disclosed conventionally for the above problem is a vehicle traveling assist device estimating a curvature of a traveling route and calculating a steering amount in which a subject vehicle should be previously steered based on a speed and yaw rate of the subject vehicle, a travel traffic lane of the subject vehicle, and a position of a vehicle traveling in front of the subject vehicle (for example, refer to Patent Document 1). In Patent Document 1, the traveling route is expressed by an arcuate curvature, weight is adjusted based on a vehicle speed and yaw rate of the subject vehicle and a history of an estimated curvature to perform calculation so that the estimated curvature of the traveling route is smoothly changed, and a steering control of the subject vehicle is performed so that the subject vehicle travels along the traveling route in accordance with the acquired curvature.

PRIOR ART DOCUMENTS

Patent Documents

Patent Document 1: Japanese Patent Application Laid-Open No. 2014-135016

SUMMARY

Problem to be Solved by the Invention

In Patent Document, 1, only the estimation is performed so that the curvature of the traveling route changes smoothly based on the vehicle speed and yaw rate of the subject vehicle and the position of the vehicle traveling in front of the subject vehicle, so that when a traveling route before a curve is expressed only by the curvature, for example, an error occurs, and the traveling route and a shape of an actual road on which the subject vehicle should travel do not necessarily coincide with each other. As described above, there is conventionally room for improvement in the accuracy of the traveling route.

The present invention is therefore has been made to solve problems as described above, and it is an object of the present invention to provide a traveling route generation device capable of generating a traveling route with a high degree of accuracy, and a vehicle control device performing traveling control of a vehicle so that the vehicle travels along the traveling route generated by the traveling route generation device.

Means to Solve the Problem

In order to solve the above problems, a traveling route generation device according to the present invention includes: a travel region information acquisition unit acquiring travel region information which is information of a region where a vehicle travels and includes point group information which is a group of a plurality of positions along a road; and a traveling route generation unit generating information of a curved line expressing a route along which the vehicle should proceed by approximating the point group information included in the travel region information to a curved line, wherein an output of the traveling route generation unit is supplied to a vehicle controller of a vehicle control device performing steering control of the vehicle, the traveling route generation unit increases weight of the point group information included in the travel region information in a range used for the steering control in the travel region information to be larger than weight of the point group information included in the travel region information in a range which is not used for the steering control to generate information of the curved line, and the range which is not used for the steering control is the point group information before and after the range used for the steering control.

Effects of the Invention

According to the present invention, a traveling route generation device includes: a travel region information acquisition unit acquiring travel region information which is information of a region where a vehicle travels and includes point group information which is a group of a plurality of positions along a road; and a traveling route generation unit generating information of a curved line expressing a route along which the vehicle should proceed by approximating the point group information included in the travel region information to a curved line, wherein an output of the traveling route generation unit is supplied to a vehicle controller of a vehicle control device performing steering control of the vehicle, the traveling route generation unit increases weight of the point group information included in the travel region information in a range used for the steering control in the travel region information to be larger than weight of the point group information included in the travel region information in a range which is not used for the steering control to generate information of the curved line, and the range which is not used for the steering control is the point group information before and after the range used for the steering control. Thus, the traveling route can be generated with a high degree of accuracy.

These and other objects, features, aspects and advantages of the present invention will become more apparent from the following detailed description when taken in conjunction with the accompanying drawings.

BRIEF DESCRIPTION OF DRAWINGS

FIG. 2 is a block diagram illustrating an example of a configuration of the traveling route generation device according to the embodiment 1 of the present invention.

FIG. 4 is a block diagram illustrating an example of a configuration of a vehicle control device according to the embodiment 1 of the present invention.

DESCRIPTION OF EMBODIMENT(S)

Embodiments of the present invention are described in detail based on the drawings hereinafter.

Embodiment 1

<Configuration>

Figure 1:
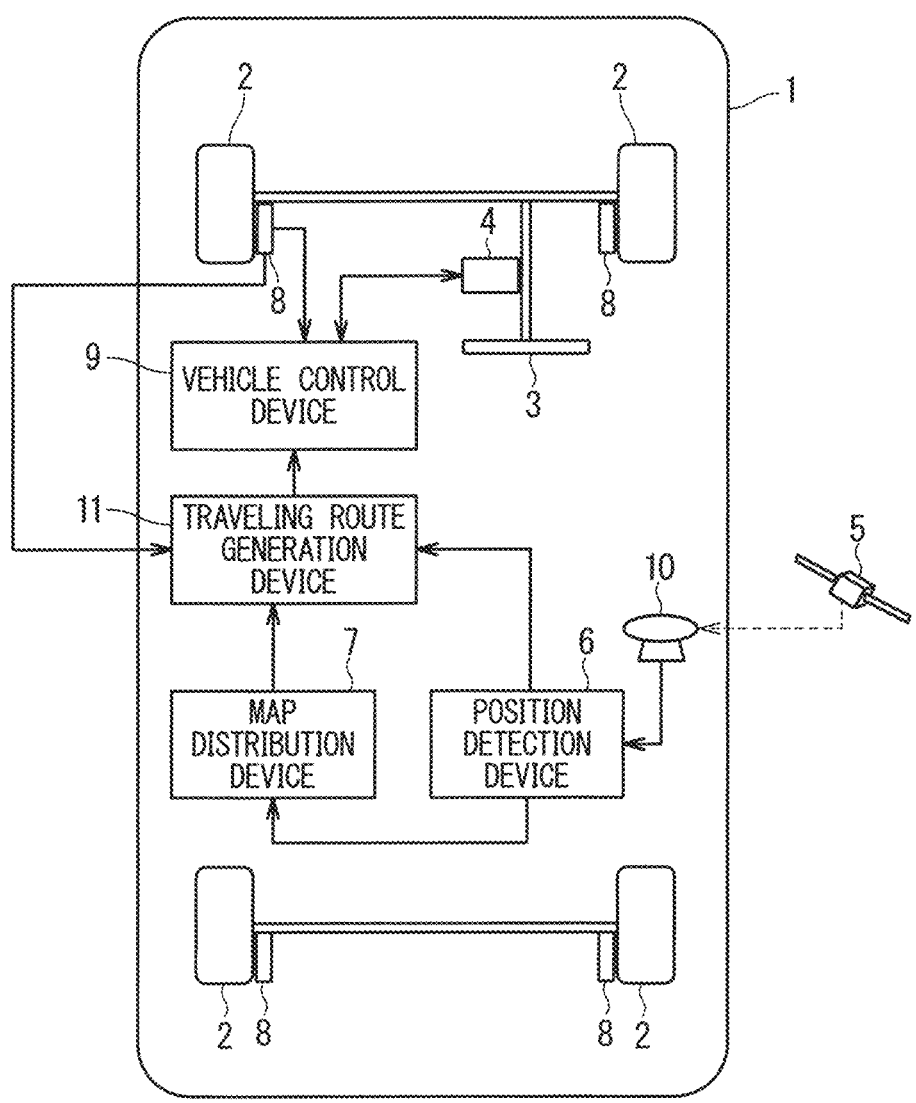
FIG. 1 is a drawing illustrating a whole configuration of a vehicle system including a traveling route generation device according to an embodiment 1 of the present invention.

FIG. 1 is a drawing illustrating a whole configuration of a vehicle system including a traveling route generation device 11 according to an embodiment 1 of the present invention.

As illustrated in FIG. 1, the vehicle system is applied to a vehicle 1 including vehicle wheels 2 and a handle 3, and includes a steering device 4, an antenna 10, a position detection device 6, a map distribution device 7, a vehicle speed sensor 8, a vehicle control device 9, a traveling route generation device 11, and a yaw rate sensor which is not shown in the drawings.

In FIG. 1, the position detection device 6 and the map distribution device 7 are separately configured, but may also be integrally configured. The traveling route generation device 11 and the vehicle control device 9 are separately configured, but may also be integrally configured.

The steering device 4 is made up of an electric power steering (EPS) motor and an electronic control unit (ECU), for example. The steering device 4 operates in accordance with a steering instruction value being input from the vehicle control device 9, and can control a rotation of the handle 3 or two vehicle wheels 2 on a front side.

A satellite 5 is made up of a plurality of global positioning system (GPS) satellites, for example. In the present embodiment 1, the satellite 5 is described as a GPS satellite, but is not limited thereto. The satellite 5 may be the other positioning satellite such as a global navigation satellite system (GLONASS), for example.

The antenna 10 receives a satellite signal transmitted from the satellite 5 and outputs the received satellite signal to the position detection device 6.

The position detection device 6 is made up of a GPS receiver, processes the satellite signal received by the antenna 10 to detect a position and an azimuth angle of the vehicle 1, and outputs the detected position and azimuth angle of the vehicle 1 to the map distribution device 7 and the traveling route generation device 11.

In the example in the present embodiment 1, the position detection device 6 is described as a GPS receiver, but is not limited thereto. The position detection device 6 may be a receiver compatible with the other system such as GLONASS, for example.

The satellite signal received from the satellite 5 or correction information via Internet may be acquired to increase an accuracy of the position detected by the position detection device 6, and the position detection device 6 may have a configuration compatible with a differential GPS (DGPS). The position detection device 6 may have a configuration of a combination of a yaw rate sensor and a vehicle speed sensor to calculate the position and the azimuth angle of the vehicle 1, that is to say, a dead reckoning configuration to perform a robust positional detection against disturbance.

The vehicle speed sensor 8 detects a travel speed of the vehicle 1, and outputs a detection result as a speed V to the vehicle control device 9 and the traveling route generation device 11. FIG. 1 illustrates a configuration that the vehicle speed sensor 8 disposed on one of the four vehicle wheels 2 detects the speed V, however, the configuration is not limited thereto. For example, also applicable a configuration that an average of vehicle speeds detected by the vehicle speed sensor 8 disposed on each of the four vehicle wheels 2 or an average of vehicle speeds detected by the vehicle speed sensor 8 disposed on the rear two vehicle wheels 2 is detected as the vehicle speed V.

the map distribution device 7 outputs road information which is information of a road on which the vehicle 1 travels to the traveling route generation device 11 based on the position and the azimuth angle of the vehicle 1 being input from the position detection device 6. Herein, the road information includes point group information which is a group of positions expressed by latitude and longitude of a center of a traffic lane, the number of traffic lanes, and a curvature of a road, for example. The map distribution device 7 outputs, to the traveling route generation device 11, point group information converted into a subject vehicle coordinate system defining the vehicle 1 or a point near the vehicle 1 as an origin point based on the azimuth angle of the vehicle 1 being input from the position detection device 6.

FIG. 2 is a block diagram illustrating an example of a configuration of the traveling route generation device 11.

As illustrated in FIG. 2, the traveling route generation device 11 includes a vehicle position information acquisition unit 12, a road information acquisition unit 13, a vehicle information acquisition unit 14, a travel region information acquisition unit 15, and a traveling route generation unit 16.

The vehicle position information acquisition unit 12 acquires current position information of the vehicle 1 from the position detection device 6. The current position information includes the position and the azimuth angle of the vehicle 1. The road information acquisition unit 13 acquires the road information from the map distribution device 7. The vehicle information acquisition unit 14 acquires vehicle information which is information regarding the vehicle 1 from various types of sensor disposed in the vehicle 1. For example, the vehicle information acquisition unit 14 acquires the speed V which is speed information of the vehicle 1 from the vehicle speed sensor 8. The vehicle information acquisition unit 14 acquires a yaw rate of the vehicle 1 from the yaw rate sensor not shown in the drawings.

The travel region information acquisition unit 15 acquires travel region information which is information of a region where the vehicle 1 travels based on the current position information acquired by the vehicle position information acquisition unit 12, the point group information acquired by the road information acquisition unit 13, and the vehicle information acquired by the vehicle information acquisition unit 14. The travel region information includes the current position information and the point group information.

The traveling route generation unit 16 generates information of a curved line expressing a route along which the vehicle 1 should proceed based on the travel region information acquired by the travel region information acquisition unit 15. Herein, the curved line expressing the route along which the vehicle 1 should proceed corresponds to the traveling route of the vehicle 1. That is to say, the traveling route generation unit 16 generates the traveling route of the vehicle 1. The traveling route generated by the traveling route generation unit 16 is output to the vehicle control device 9.

Figure 3:
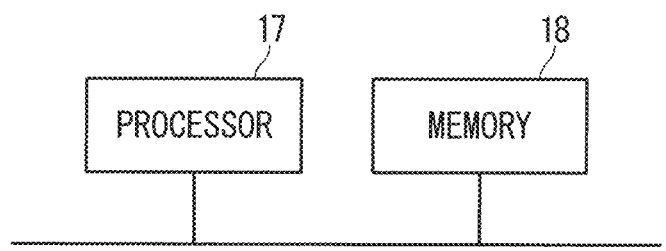
FIG. 3 is a block diagram illustrating an example of a hardware configuration of the traveling route generation device according to the embodiment 1 of the present invention.

FIG. 3 is a block diagram illustrating an example of a hardware configuration of the traveling route generation device 11.

Each function of the vehicle position information acquisition unit 12, the road information acquisition unit 13, the vehicle information acquisition unit 14, the travel region information acquisition unit 15, and the traveling route generation unit 16 in the traveling route generation device 11 is achieved by a processing circuit. That is to say, the traveling route generation device 11 includes a processing circuit for acquiring the current position information of the vehicle 1, acquiring the road information, acquiring the vehicle information, acquiring the travel region information, and generating the traveling route. Examples of the processing circuit include a processor 17 (also referred to as a central processing unit, a processing device, an arithmetic device, a microprocessor, a microcomputer, or a digital signal processor (DSP)) executing a program stored in a memory 18.

Each function of the vehicle position information acquisition unit 12, the road information acquisition unit 13, the vehicle information acquisition unit 14, the travel region information acquisition unit 15, and the traveling route generation unit 16 in the traveling route generation device 11 is achieved by software, firmware, or a combination of software and firmware. The software or the firmware is described as a program and is stored in the memory 18. The processing circuit reads out and executes a program stored in the memory 18, thereby achieving the function of each unit. That is to say, the traveling route generation device 11 includes the memory 18 for storing the program to resultingly execute steps of acquiring the current position information of the vehicle 1, acquiring the road information, acquiring the vehicle information, acquiring travel region information, and generating the traveling route. These programs are also deemed to make a computer execute procedures or methods of the vehicle position information acquisition unit 12, the road information acquisition unit 13, the vehicle information acquisition unit 14, the travel region information acquisition unit 15, and the traveling route generation unit 16. Herein, a memory may be a non-volatile or volatile semiconductor memory such as a Random Access Memory (RAM), a Read Only Memory (ROM), a flash memory, an Electrically Programmable Read Only Memory (EPROM), or an Electrically Erasable Programmable Read Only Memory (EEPROM), a magnetic disc, a flexible disc, an optical disc, a compact disc, a DVD, or any storage medium which is to be used in the future.

FIG. 4 is a block diagram illustrating an example of a configuration of the vehicle control device 9.

As illustrated in FIG. 4, the vehicle control device 9 includes a traveling route information acquisition unit 19, a vehicle information acquisition unit 20, and a vehicle controller 21. The vehicle control device 9 is made up as an ECU generating a steering instruction value being output to the steering device 4.

The traveling route information acquisition unit 19 acquires the traveling route information from the traveling route generation device 11. The vehicle information acquisition unit 20 acquires vehicle information which is information regarding the vehicle 1 from various types of sensor disposed in the vehicle 1. For example, the vehicle information acquisition unit 20 acquires the speed V which is speed information of the vehicle 1 from the vehicle speed sensor 8. The vehicle information acquisition unit 20 acquires a yaw rate of the vehicle 1 from the yaw rate sensor not shown in the drawings.

The vehicle controller 21 performs steering control of the vehicle 1 so that the vehicle 1 travels along the traveling route based on route information acquired by the traveling route information acquisition unit 19 and vehicle information acquired by the vehicle information acquisition unit 20. Specifically, the vehicle controller 21 outputs the steering instruction value for performing the steering control of the vehicle 1 to the steering device 4.

Figure 5:
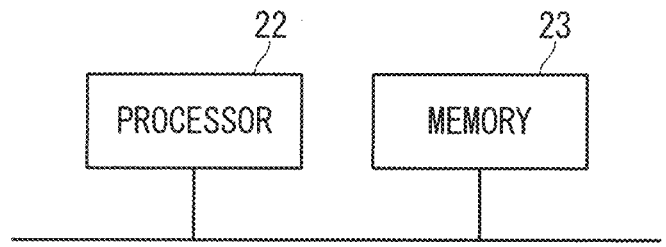
FIG. 5 is a block diagram illustrating an example of a hardware configuration of the vehicle control device according to the embodiment 1 of the present invention.

FIG. 5 is a block diagram illustrating an example of a hardware configuration of the vehicle control device 9.

Each function of the traveling route information acquisition unit 19, the vehicle information acquisition unit 20, and the vehicle controller 21 in the vehicle control device 9 is achieved by a processing circuit. That is to say, the vehicle control device 9 includes a processing circuit for acquiring the traveling route information, acquiring the vehicle information, and performing the steering control of the vehicle 1. The processing circuit is a processor 22 executing a program stored in a memory 23.

Each function of the traveling route information acquisition unit 19, the vehicle information acquisition unit 20, and the vehicle controller 21 in the vehicle control device 9 is achieved by software, firmware, or a combination of software and firmware. The software or the firmware is described as a program and is stored in the memory 23. The processing circuit reads out and executes a program stored in the memory 23, thereby achieving the function of each unit. That is to say, the vehicle control device 9 includes the memory 23 for storing the program to resultingly execute steps of acquiring the traveling route information, acquiring the vehicle information, and performing the steering control of the vehicle 1. These programs are also deemed to make a computer execute procedures or methods of the traveling route information acquisition unit 19, the vehicle information acquisition unit 20, and the vehicle controller 21.

<Operation>
<Operation of Traveling Route Generation Device 11>

Figure 6:
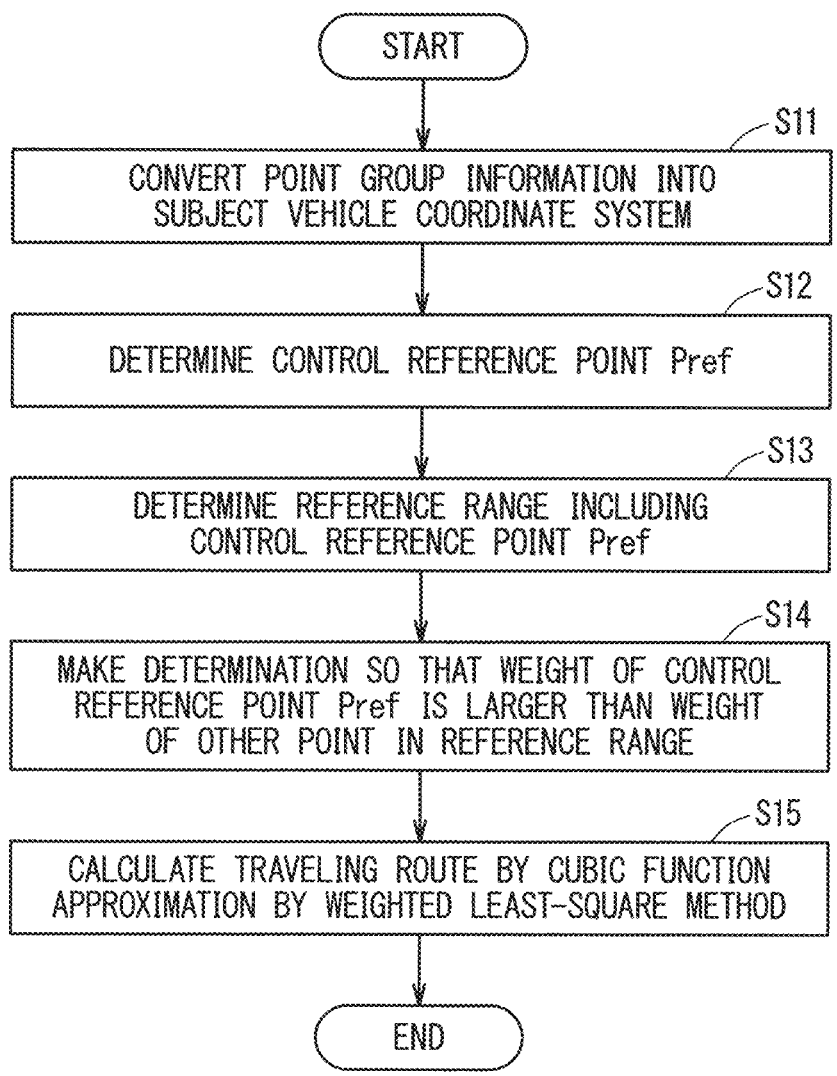
FIG. 6 is a flow chart illustrating an example of an operation of the traveling route generation device according to the embodiment 1 of the present invention.

FIG. 6 is a flow chart illustrating an example of an operation of the traveling route generation device 11.

In Step S11, the traveling route generation unit 16 converts the point group information into a subject vehicle coordinate system defining the vehicle 1 as an origin point and a traveling direction of the vehicle 1 as an X axis based on the position and the azimuth angle of the vehicle 1 and the point group information in the travel region.

Specifically, the traveling route generation unit 16 converts the point group information expressed by latitude, longitude, and altitude into a planate form by a coordinate conversion such as Gauss-Krueger projection. In the present embodiment 1, the point group information is converted into a meter coordinate system defining an eastward direction as an X axis and a northward direction as a Y axis. In order to convert the point group information into the subject vehicle coordinate system defining the position of the vehicle 1 as an origin point and the traveling direction of the vehicle 1 as an X axis, X and Y of the point group information are offset so that the position of the vehicle 1 corresponds to the origin point, and the point group information is further rotated so that the azimuth angle of the vehicle 1 and the X axis coincide with each other.

In Step S12, the traveling route generation unit 16 determines a control reference point Pref, which is a range used for the steering control, determined in accordance with a preset state quantity of the vehicle 1. Herein, examples of the state quantity of the vehicle 1 include the speed of the vehicle 1.

Specifically, the control reference point Pref is provided as a liner function of the speed of the vehicle 1. For example, when the vehicle speed Vx is 20 m/s and a point after two seconds is the control reference point Pref, the traveling route generation unit 16 calculates a distance Ld from the current position of the vehicle 1 to the control reference point Pref based on the following expression (1).

$$Ld = Vx \times 2 \qquad (1)$$

Figure 7:
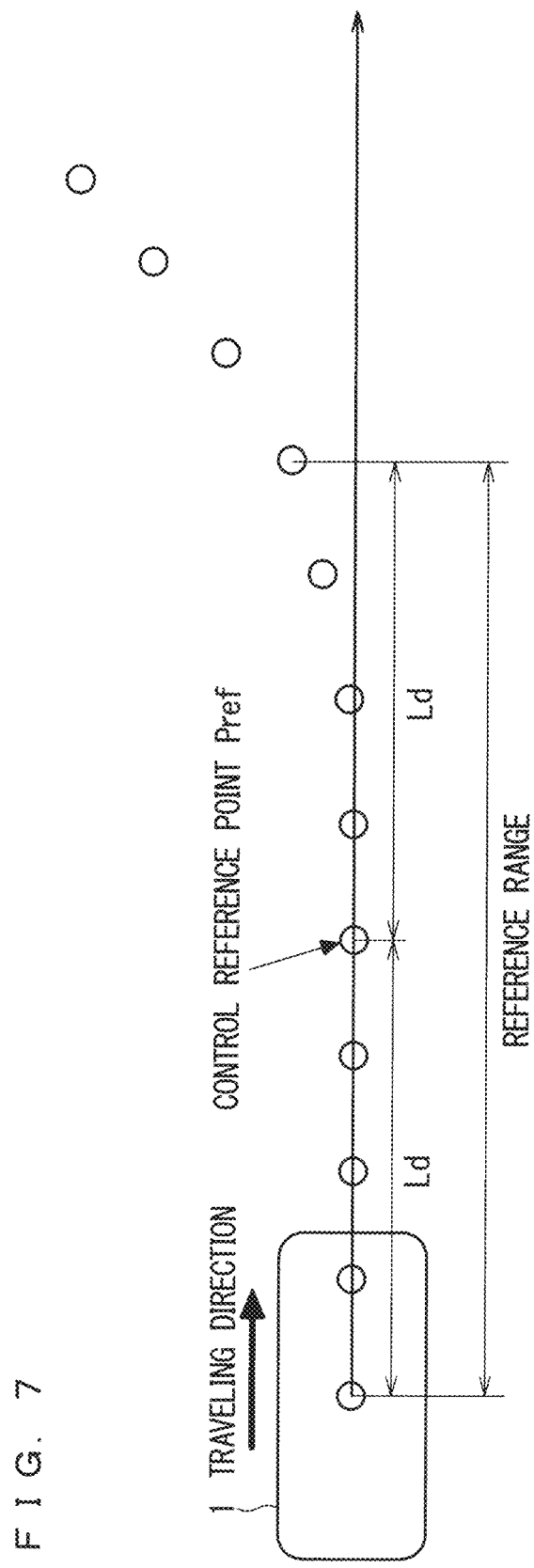
FIG. 7 is a drawing for explaining a control reference point according to the embodiment 1 of the present invention.

Herein, for example, when a map is created at 10 m interval, for example, as illustrated in FIG. 7, the control reference point Pref is a point which is four points ahead of a point near the vehicle 1. The traveling route generation unit 16 determines this control reference point Pref as a range used for the steering control. That is to say, in the present embodiment 1, the range used for the steering control is one control reference point Pref. In FIG. 7, a circle indicates each point constituting the point group information.

In Step S13, the traveling route generation unit 16 determines a range where the point group information is approximated to a curved line.

Specifically, the traveling route generation unit 16 determines the reference range including the control reference point Pref determined in Step S12. The reference range indicates a range of the point group information referenced when the traveling route generation unit 16 generates the traveling route, and indicates a range where the point group information is approximated to the curved line. In the present embodiment 1, as illustrated in FIG. 7, every 40 m, that is to say, every four points are referenced in a front-back direction on the basis of the control reference point Pref, and nine points in total are defined as the reference range. In this manner, the traveling route generation unit 16 determines the reference range including the control reference point Pref.

In Step S14, the traveling route generation unit 16 determines weight of each point used for the approximation in the reference range.

Figure 8:
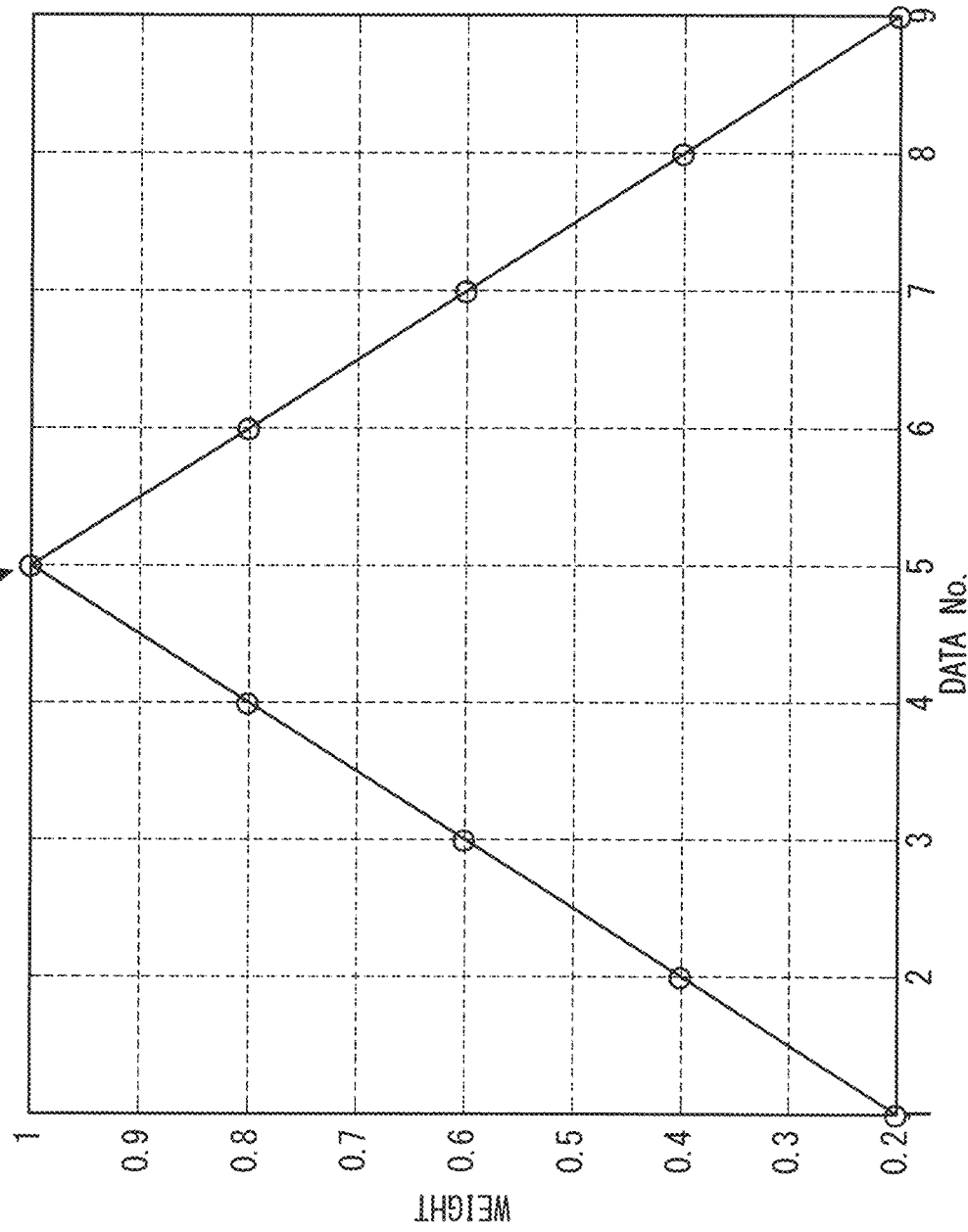
FIG. 8 is a drawing illustrating an example of weight of each point in a reference range according to the embodiment 1 of the present invention.

Specifically, the traveling route generation unit 16 makes a determination so that the weight of the control reference point Pref is larger than that of the point other than the control reference point Pref in the reference range as illustrated in FIG. 8.

In Step S15, the traveling route generation unit 16 approximates the point group information to the curved line based on the weight determined in Step S14, thereby calculating the traveling route.

Specifically, the traveling route generation unit 16 approximates a coordinate of the point group to a cubic function based on the weight determined in Step S14 using a cubic function approximation by a weighted least-square method.

Figure 9:
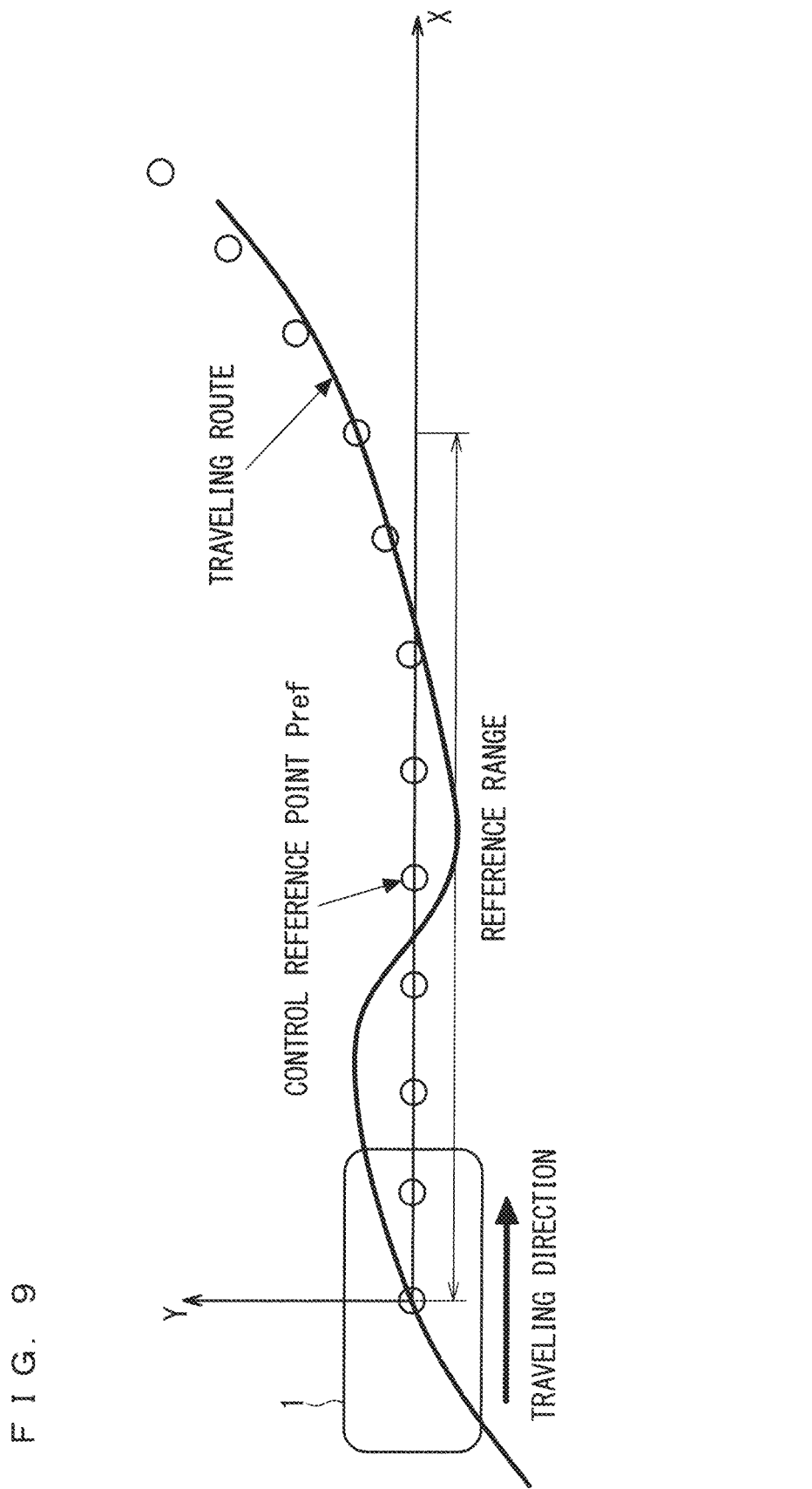
FIG. 9 is a drawing illustrating an example of a traveling route calculated by a cubic function approximation without weighting according to a comparison example.
Figure 10:
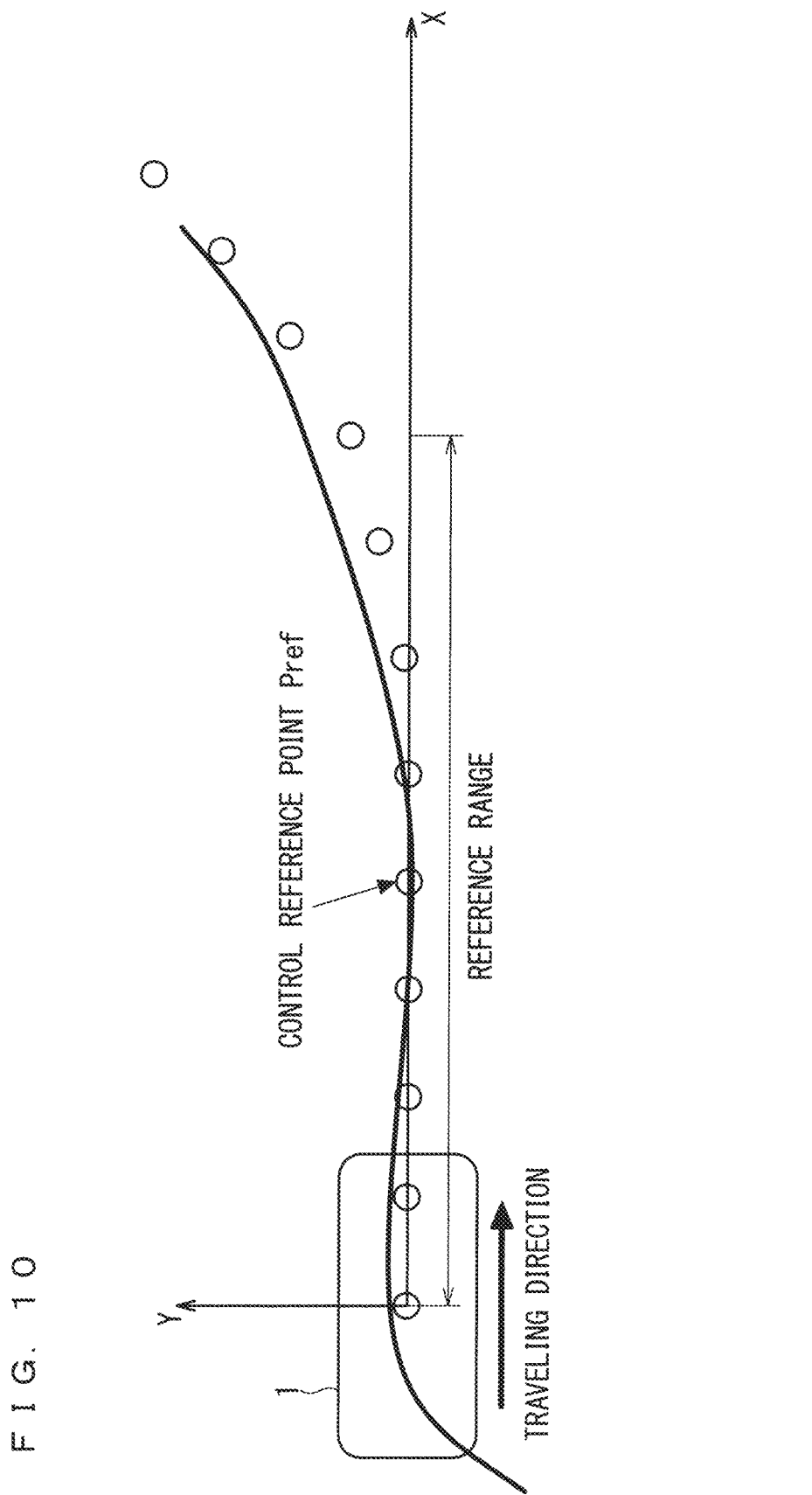
FIG. 10 is a drawing illustrating an example of a traveling route calculated by a cubic function approximation with weighting according to the embodiment 1 of the present invention.

As described above, the weight of the control reference point Pref is increased to perform the cubic function approximation, thus the approximation accuracy of the curved line calculated by the weighted cubic function approximation in the control reference point Pref (refer to FIG. 10) is higher than the approximation accuracy of the curved line calculated by the non-weighted cubic function approximation in the control reference point Pref (refer to FIG. 9).

<Operation of Vehicle Control Device 9>

Figure 11:
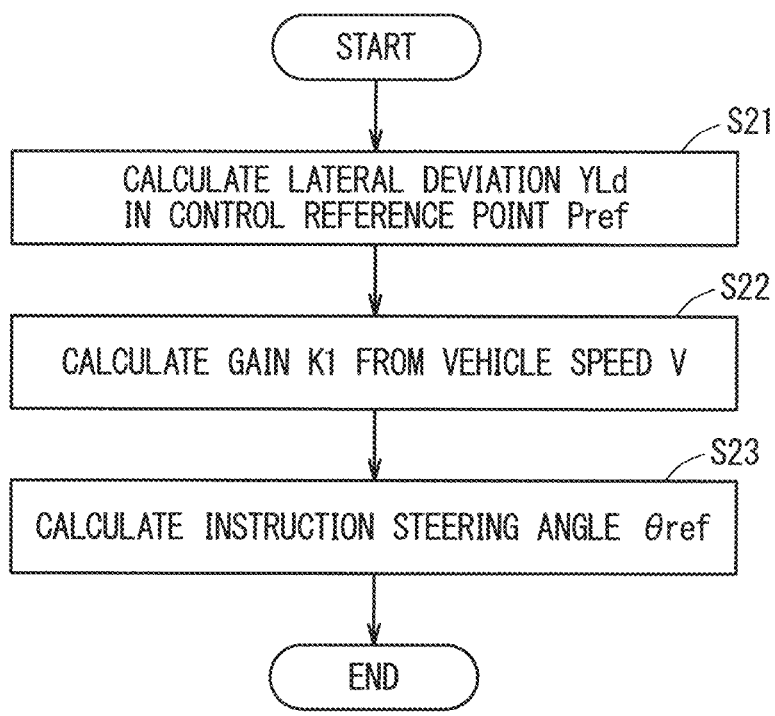
FIG. 11 is a flow chart illustrating an example of an operation of the vehicle control device according to the embodiment 1 of the present invention.

FIG. 11 is a flow chart illustrating an example of an operation of the vehicle control device 9.

In Step S21, the vehicle controller 21 calculates a lateral deviation YLd in the control reference point Pref.

Specifically, when the cubic function calculated by the traveling route generation unit 16 of the traveling route generation device 11 is a function of x, that is y=f(x), the lateral deviation YLd is expressed by the following expression (2) using a distance Ld to the control reference point Pref.

$$YLd=f(Ld) \quad (2)$$

In Step S22, the vehicle controller 21 calculates a gain K1 from the vehicle speed V.

Specifically, a gain obtained from a vehicle specification, for example, is previously calculated as a vehicle speed-variable function or map so that the vehicle 1 can follow the traveling route stably with high response, and the gain K1 corresponding to the current speed V of the vehicle 1 is calculated.

In Step S23, the vehicle controller 21 calculates an instruction steering angle @ref. Herein, the instruction steering angle θref corresponds to a steering instruction value being output to the steering device 4 to perform the steering control of the vehicle 1.

Specifically, the vehicle controller 21 calculates the instruction steering angle θref based on the vehicle speed V so that the lateral deviation YLd in the control reference point Pref gets small. The instruction steering angle @ref is expressed by the following expression (3).

$$\theta ref = K1 \times YLd \quad (3)$$

Figure 12:
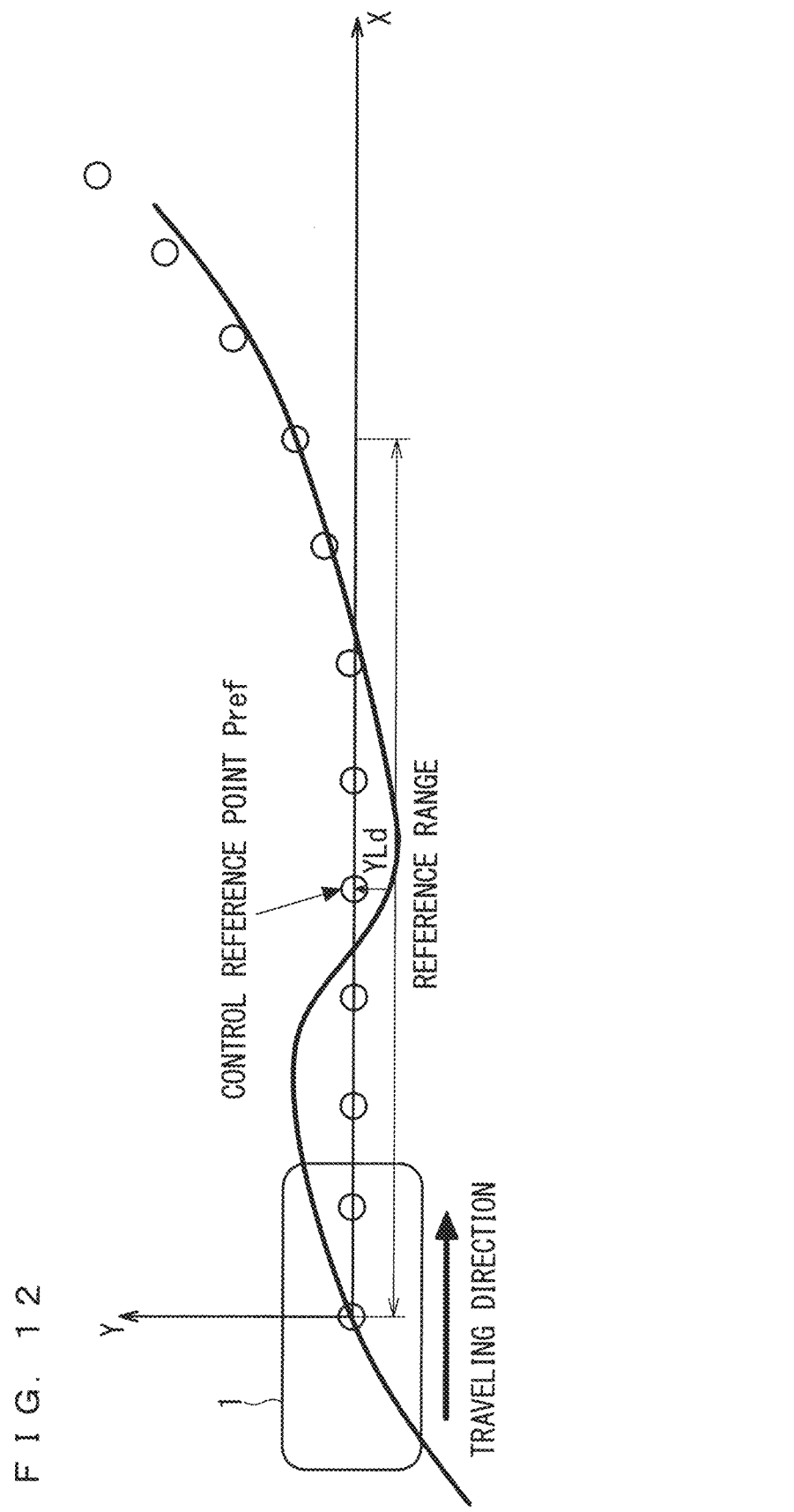
FIG. 12 is a drawing illustrating an example of a traveling route calculated by a cubic function approximation without weighting according to a comparison example.
Figure 13:
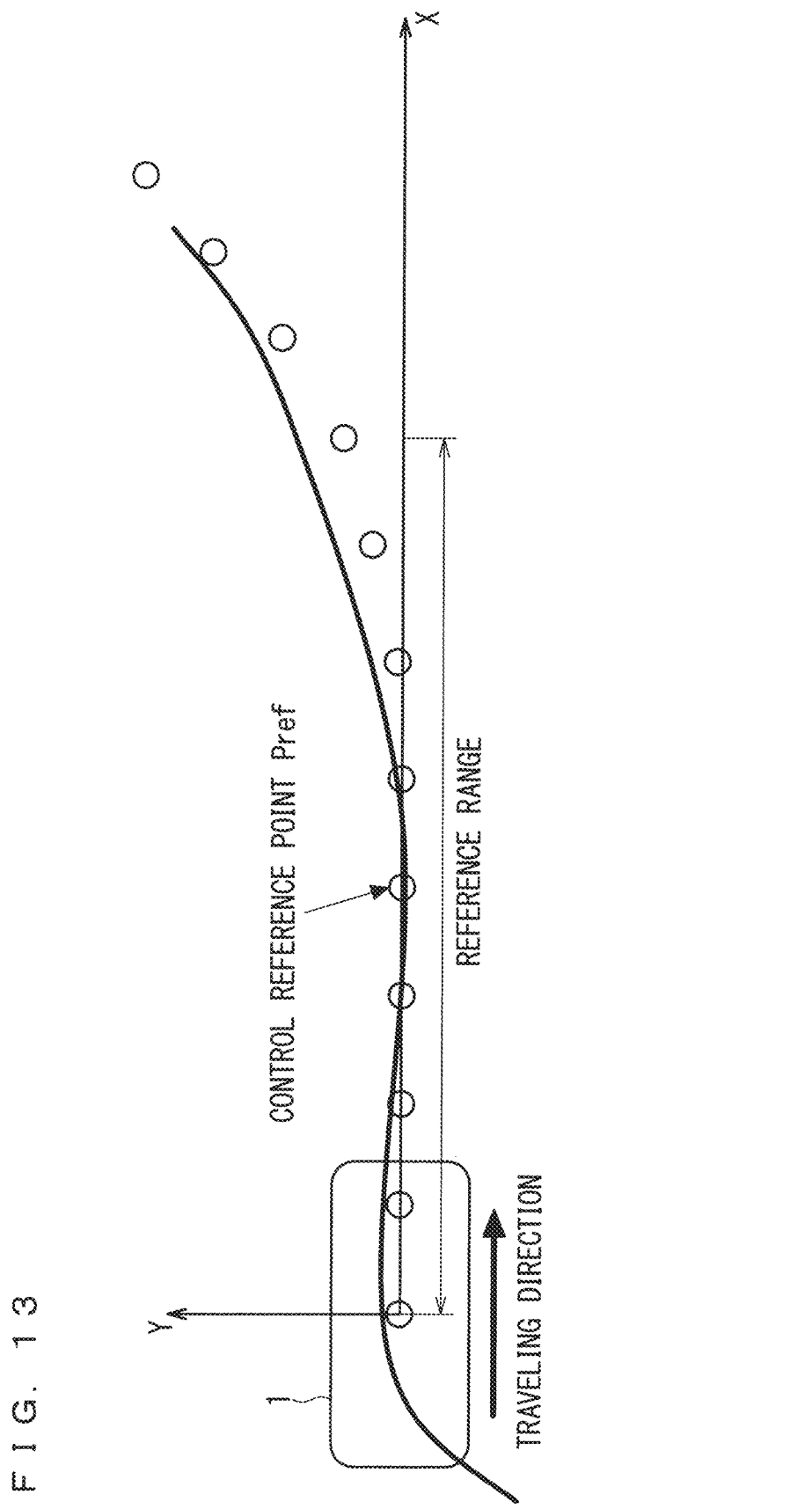
FIG. 13 is a drawing illustrating an example of a traveling route calculated by a cubic function approximation with weighting according to the embodiment 1 of the present invention.

As described above, according to the present embodiment 1, the weight of the control reference point Pref is set larger than that of the other point, thus the approximation accuracy in the control reference point Pref can be increased. For example, as illustrated in FIG. 12, when a curved line is calculated by a non-weighted cubic function approximation, each point is expressed by a cubic function, thus the lateral deviation YLd in the control reference point Pref takes a negative value in a direction opposite to a curve in front of the vehicle 1 in the traveling direction. Accordingly, the vehicle controller 21 calculates the instruction steering angle θref in a right direction, thus a following capability of the vehicle 1 following the traveling route is reduced, and there is a possibility that a driver has a feeling of strangeness on the traveling of the vehicle 1. In the meanwhile, the weight of the control reference point Pref is set larger than that of the other point, thus the lateral deviation YLd can be brought close to an actual value. Accordingly, as illustrated in FIG. 13, a substantially straight instruction steering angle θref is obtained, and the following capability of the vehicle 1 following the traveling route is favorably maintained, thus the feeling of strangeness of the driver on the traveling of the vehicle 1 can be suppressed.

Described in the present embodiment 1 is a case where the instruction steering angle θref is calculated by the lateral deviation YLd in the control reference point Pref, however, the calculation method is not limited thereto. For example, as expressed by the following expressions (4) and (5), the instruction steering angle θref may be calculated further using an angle deviation eLd in the control reference point Pref and a predetermined gain K2 in the manner similar to the gain K1.

$$eLd=f(Ld) \quad (4)$$

$$\theta ref = K1 \times YLd + K2 \times eLd \quad (5)$$

Accordingly, the vehicle 1 can travel along the traveling route in consideration of not only the lateral deviation YLd in front of the vehicle 1 but also the angle deviation, and the following capability of the vehicle 1 following the traveling route is improved.

In the present embodiment 1, the traveling route is expressed using the cubic function approximation, however, the other weighted approximation method may be used. For example, the traveling route may be expressed using a quintic function approximation or non-uniform rational B-spline (NURBS). The effect similar to that of the present embodiment 1 can be obtained also in this case.

In the present embodiment 1, the point group of the traveling route is made up by the road information and the satellite positioning, but may also be made up by the other method. For example, also applicable is a configuration that the point group of the traveling route is made up by detecting the traveling route by a light detection and ranging (Lidar) or a camera and discretizing the traveling route.

Embodiment 2

Described in the embodiment 1 is a case where the weight of the control reference point Pref in front of the vehicle 1 is larger than that of the other point. Described in an embodiment 2 of the present invention is a case where the control reference point Pref is located in a barycentric position of the vehicle 1, the traveling route generation device 11 calculates a tangent line and a curvature of the traveling route in the control reference point Pref, and the vehicle control device 9 calculates the instruction steering angle θref based on the tangent line and the curvature of the traveling route in the control reference point Pref. Each configuration of the vehicle 1, the traveling route generation device 11, and the vehicle control device 9 according to the present embodiment 2 is similar to that in the embodiment 1, thus the detailed description thereof is omitted herein.

<Operation>
<Operation of Traveling Route Generation Device 11>

Figure 14:
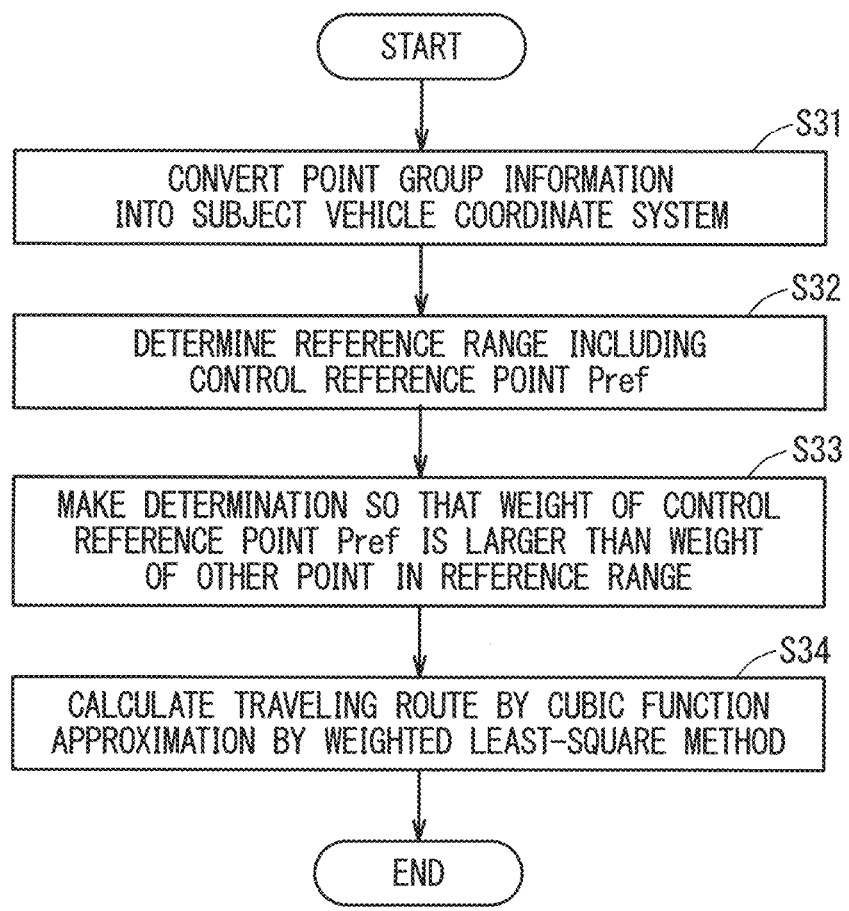
FIG. 14 is a flow chart illustrating an example of an operation of a traveling route generation device according to an embodiment 2 of the present invention.

FIG. 14 is a flow chart illustrating an example of an operation of the traveling route generation device 11.

In Step S31, the traveling route generation unit 16 converts the point group information into a subject vehicle coordinate system defining the vehicle 1 as an origin point and a traveling direction of the vehicle 1 as an X axis based on the position and the azimuth angle of the vehicle 1 and the point group information in the travel region in the manner similar to Step S11 in FIG. 6. Next, the traveling route generation unit 16 sets the barycentric position of the vehicle 1 to the control reference point Pref.

In Step S32, the traveling route generation unit 16 determines a range where the point group information is approximated to a curved line.

Figure 15:
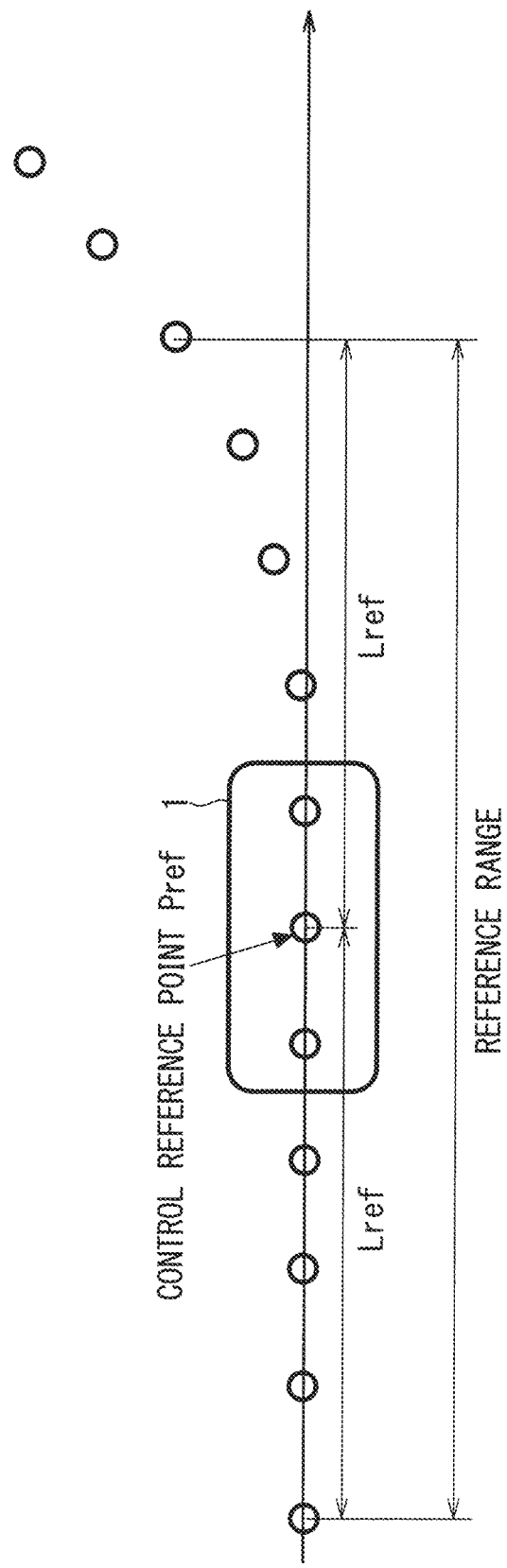
FIG. 15 is a drawing for explaining a reference range according to the embodiment 2 of the present invention.

Specifically, as illustrated in FIG. 15, every Lrefm, for example, Lref=25 m, that is to say, every five points are referenced in a front-back direction on the basis of the control reference point Pref, and eleven points in total are defined as the reference range. In this manner, the traveling route generation unit 16 determines the reference range including the control reference point Pref.

In Step S33, the traveling route generation unit 16 determines weight of each point used for the approximation in the reference range.

Figure 16:
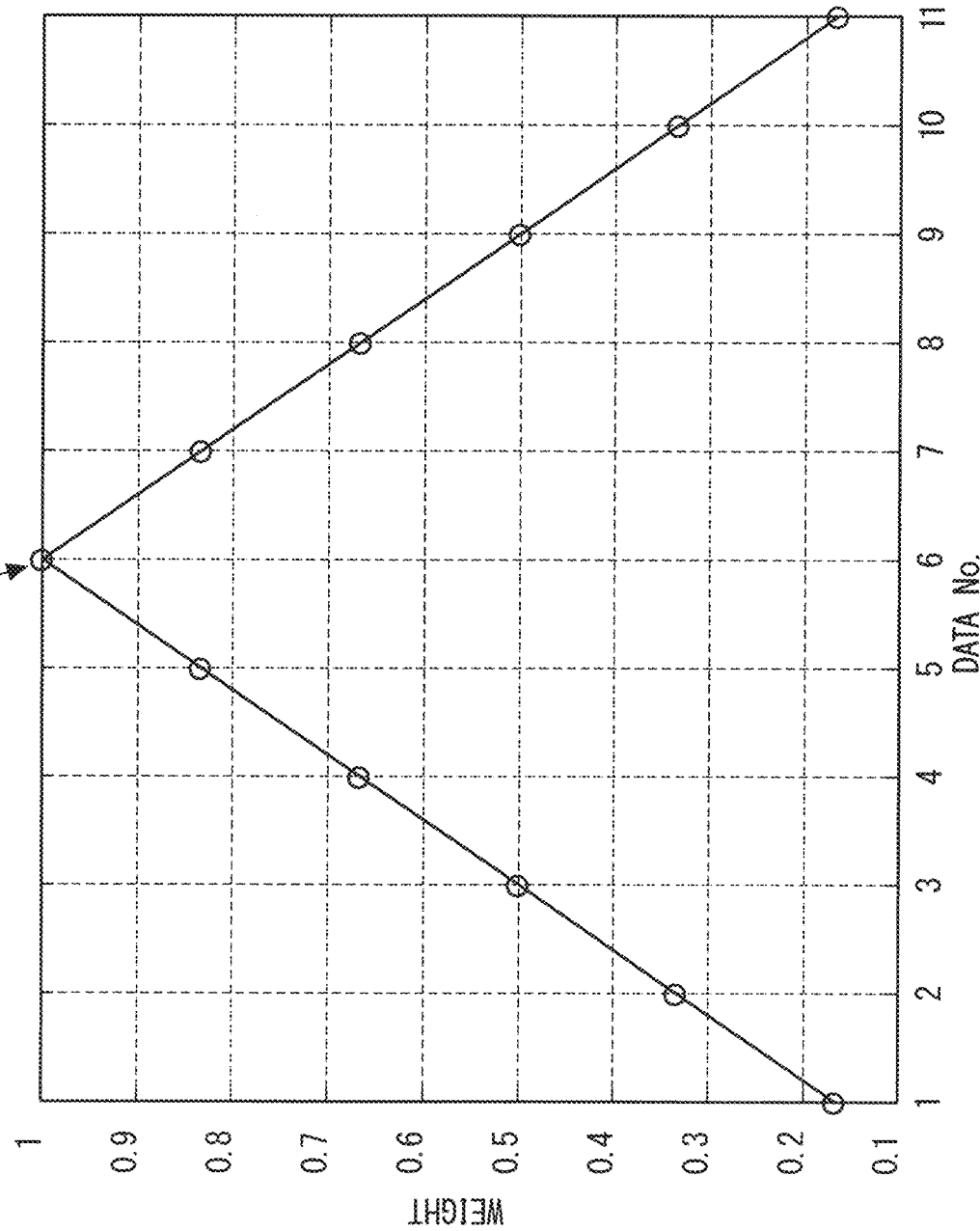
FIG. 16 is a drawing illustrating an example of weight of each point in a reference range according to the embodiment 2 of the present invention.

Specifically, the traveling route generation unit 16 makes a determination so that the weight of the control reference point Pref is larger than that of the point other than the control reference point Pref in the reference range as illustrated in FIG. 16. In the present embodiment 2, the barycentric position of the vehicle 1 is the control reference point Pref, thus the point group information is approximated in a range including a point group in back of the vehicle 1.

In Step S34, the traveling route generation unit 16 approximates the point group information to the curved line based on the weight determined in Step S33, thereby calculating the traveling route.

Specifically, the traveling route generation unit 36 approximates a coordinate of the point group to a cubic function based on the weight determined in Step S33 using a cubic function approximation by a weighted least-square method.

As described above, the weighting is performed so that the weight of the control reference point Pref which is the barycentric position of the vehicle 1 gets large and the weight of the point group in front and back of the vehicle 1 gets small to perform the cubic function approximation, thus the approximation accuracy of the calculated curved line in the control reference point Pref is higher than the approximation accuracy of the curved line calculated by the non-weighted cubic function approximation in the control reference point Pref.

<Operation of Vehicle Control Device 9>

Figure 17:
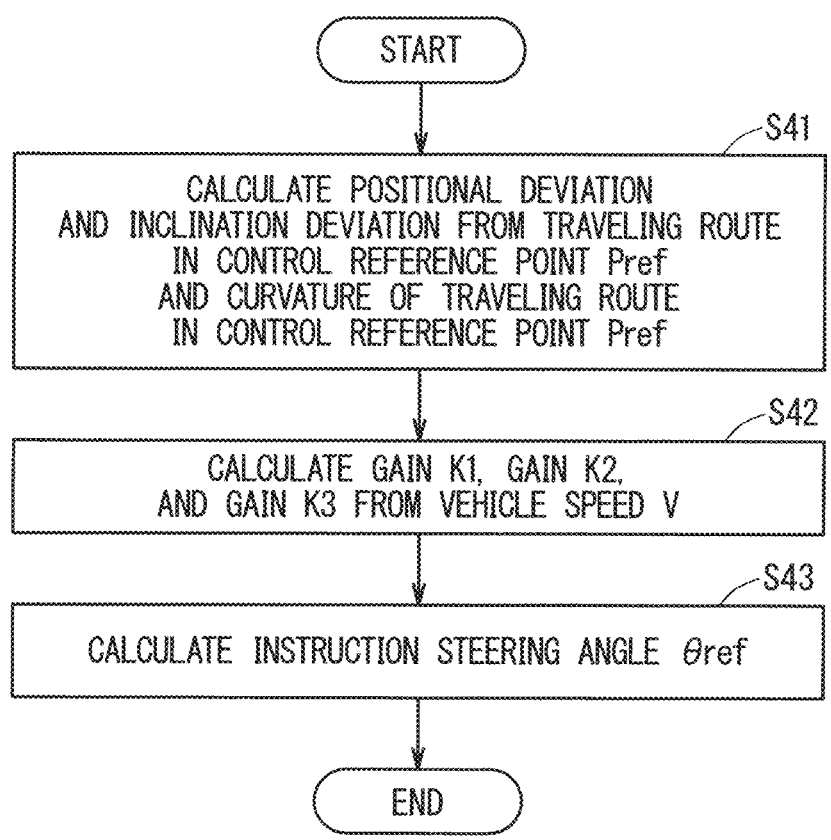
FIG. 17 is a flow chart illustrating an example of an operation of a vehicle control device according to the embodiment 2 of the present invention.

FIG. 17 is a flow chart illustrating an example of an operation of the vehicle control device 9.

In Step S41, the vehicle controller 21 calculates a positional deviation and an inclination deviation from the traveling route in the control reference point Pref and a curvature of the traveling route in the control reference point Pref.

Specifically, when the cubic function calculated by the traveling route generation unit 16 of the traveling route generation device 11 is a function of x, that is y=f(x), a positional deviation y0 in the control reference point Pref is expressed by the following expression (6), an inclination deviation d0 is expressed by the following expression (7), and a curvature κ of the traveling route is expressed by the following expression (8).

$$y0 = f(0) \quad (6)$$

$$d0 = f'(0) \quad (7)$$

$$\kappa = (f''(0))/(1+f'(0))^{3/2} \quad (8)$$

In Step S42, the vehicle controller 21 calculates a gain K1, a gain K2, and a gain K3 from the vehicle speed V.

Specifically, the positional deviation y0 and the inclination deviation d0 calculated in Step S41 indicate a relationship between the vehicle 1 and the tangent line in the traveling route, thus a gain obtained from a vehicle specification, for example, is previously calculated as a vehicle speed-variable function or map so that the vehicle 1 can follow the traveling route stably with high response, and the gain K1 and the gain K2 corresponding to the current speed V of the vehicle 1 are calculated.

A yaw rate γref necessary for the vehicle 1 to follow the traveling route with the curvature κ is expressed by the following expression (9) using the vehicle speed V.

$$\gamma ref = \kappa \times V \quad (9)$$

When a relationship between a steering angle θ and the yaw rate γ in a steady turn state is expressed by θ=K3λγ, the gain obtained from the vehicle specification, for example, can be previously calculated as the vehicle speed-variable function or the map, and the gain K3 corresponding to the current speed V of the vehicle 1 is calculated.

The instruction steering angle θref is expressed by the following equation (10) using the gain K1, the gain K2, and the gain K3 calculated in the above processes.

$$\theta ref = K1 \times y0 + K2 \times d0 + K3 \times V \times \kappa \quad (10)$$

As described above, according to the present embodiment 2, the weight of the control reference point Pref is set larger than that of the other point, thus the approximation accuracy in the control reference point Pref can be increased. The weight of the control reference point Pref is set larger than that of the other point, thus the positional deviation y0, the inclination deviation d0, and the curvature κ of the traveling route in the control reference point Pref can be brought close to actual values. Accordingly, the following capability of the vehicle 1 following the traveling route is favorably maintained, and the feeling of strangeness of the driver on the traveling of the vehicle 1 can be suppressed.

Embodiment 3

Described in the embodiments 1 and 2 is a case where the control reference point Pref is one point in front of the vehicle 1 or the barycentric position of the vehicle 1. A case where there are a plurality of control reference points Pref is described in an embodiment 3 of the present invention. Each configuration of the vehicle 1, the traveling route generation device 11, and the vehicle control device 9 according to the present embodiment 3 is similar to that in the embodiment 1, thus the detailed description thereof is omitted herein.

Specifically, a model predictive control is used for the steering control of the vehicle 1. In the model predictive control, a state in a period of Th from a current time t is predicted using a dynamic vehicle model mathematically expressing dynamics of a vehicle, and an optimization problem obtaining a control input for reducing an evaluation function J expressing a desirable operation of the vehicle is solved every predetermined period, thus an optimal instruction steering angle θref is calculated. The period of Th from the current time t is referred to as a horizon hereinafter.

In the model prediction control, an optimization problem having a limitation described below is solved every predetermined period in the present embodiment 3, thus a range used for the steering control is not limited to one point, but is defined by a time range having a predetermined duration. The range used for the steering control is also referred to as the control target range hereinafter. In this manner, the control target range is made up of the plurality of control reference points. The weight of the point group of the control target range used for the model prediction control is increased to be larger than that of the point group outside the control target range and is approximated, thus the generation of the targeted traveling route and the vehicle control can be achieved.

<Operation>

<Operation of Traveling Route Generation Device 11>

Figure 18:
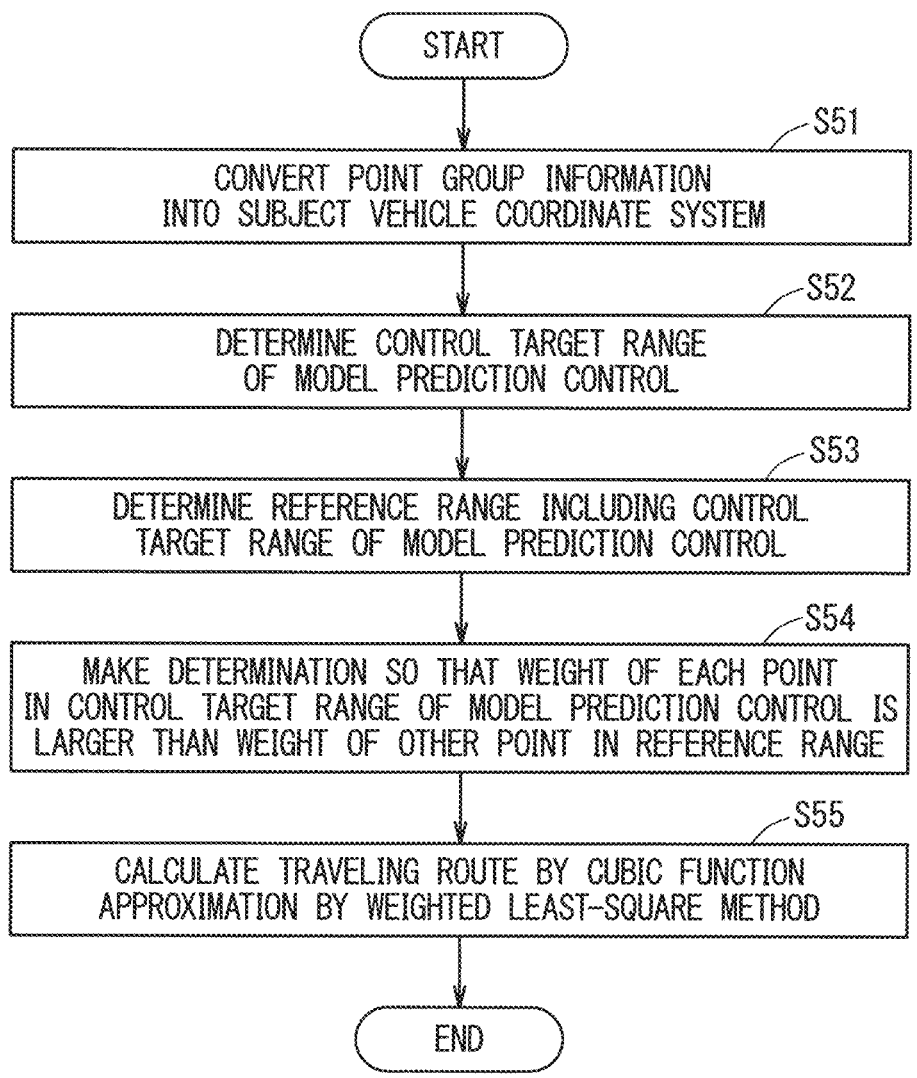
FIG. 18 is a flow chart illustrating an example of an operation of a traveling route generation device according to an embodiment 3 of the present invention.

FIG. 18 is a flow chart illustrating an example of an operation of the traveling route generation device 11.

In Step S51, the traveling route generation unit 16 converts the point group information into a subject vehicle coordinate system defining the vehicle 1 as an origin point and a traveling direction of the vehicle 1 as an X axis based on the position and the azimuth angle of the vehicle 1 and the point group information in the travel region in the manner similar to Step S11 in FIG. 6.

In Step S52, the traveling route generation unit 16 determines the control target range of the model prediction control. In the embodiments 1 and 2, the control reference point is one point, however, in the present embodiment 3, the instruction steering angle θref is calculated so that the evaluation function J in the horizon gets small, thus the control target range includes the plurality of points, that is to say, the plurality of control reference points.

In Step S53, the traveling route generation unit 16 determines a range where the point group information is approximated to a curved line.

Specifically, the traveling route generation unit 16 determines a range approximated to the curved line so as to include the point group in the period of Th from the current time t. For example, when Th is three seconds and the speed V at the current time is 20 m/s, in the model prediction control, V×Th=60 m ahead of the vehicle 1, that is to say, twelve points are referenced as the point group in the period of Th from the current time t. This range corresponds to the control target range. The reference range which is the range approximated to the curved line corresponds to the range including five points before and after the control target range, that is to say, twenty-two points in total. In this example, the vehicle 1 is located at a sixth point.

In Step S54, the traveling route generation unit 16 determines weight of each point used for the approximation in the reference range.

Figure 19:
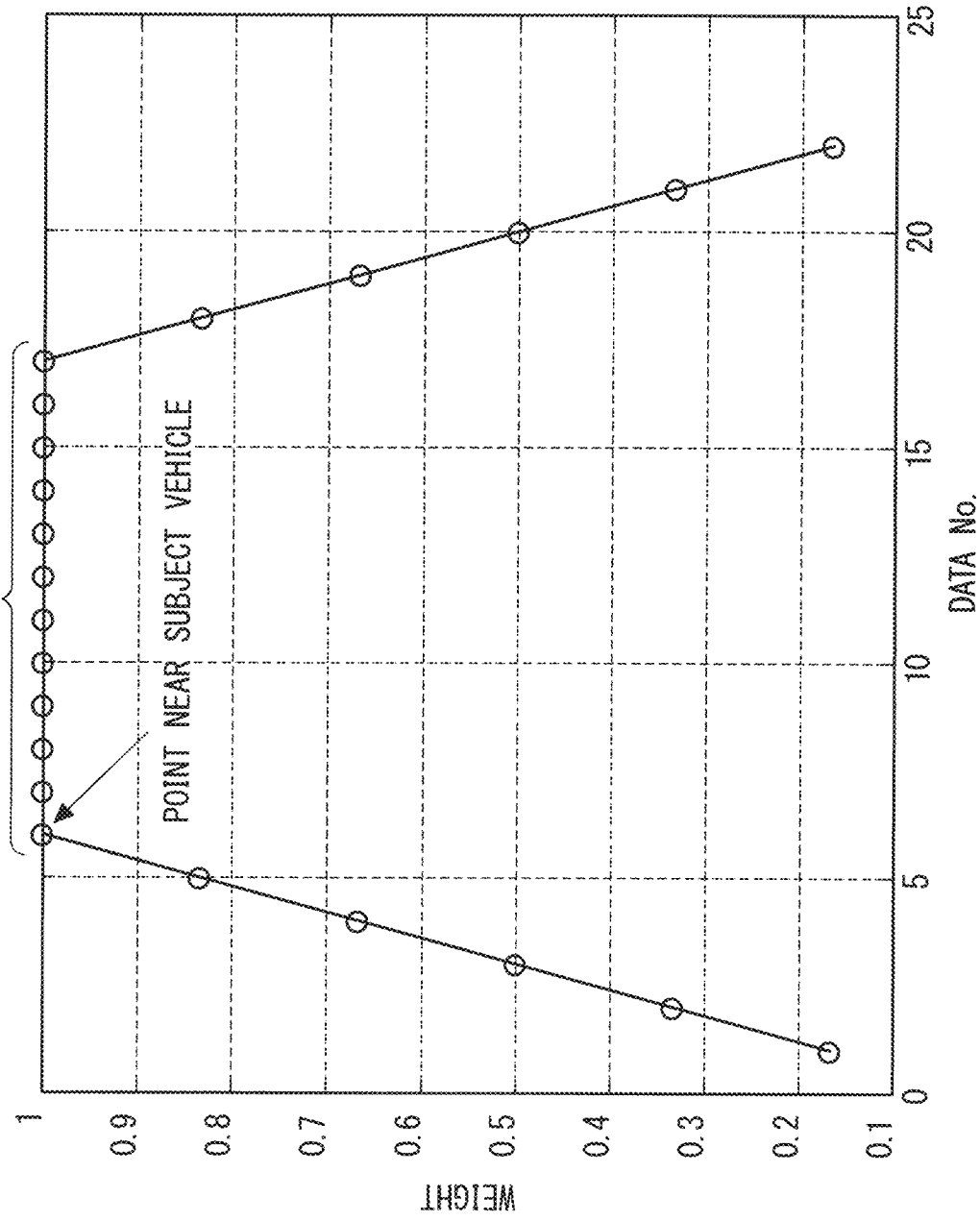
FIG. 19 is a drawing illustrating an example of weight of each point in a reference range according to the embodiment 3 of the present invention.

Specifically, as illustrated in FIG. 19, the traveling route generation unit 16 makes a determination so that the weight of the range of the horizon which is the control target range is larger than the weight of the range other than the control target range. In the present embodiment 3, the control target range is three seconds from the current time t, thus the point group information is approximated in a range including a point group in back of the vehicle 1.

In Step S55, the traveling route generation unit 16 approximates the point group information to the curved line based on the weight determined in Step S54, thereby calculating the traveling route.

Specifically, the traveling route generation unit 16 approximates a coordinate of the point group to a cubic function based on the weight determined in Step S54 using a cubic function approximation by a weighted least-square method.

As described above, the weighting is performed so that the weight of the range of the horizon which is the control target range gets large and the weight of the point group in the range other than the control target range gets small to perform the cubic function approximation, thus the approximation accuracy in the calculated range of the horizon is higher than the approximation accuracy in the range of the horizon calculated by the non-weighted cubic function approximation.

<Operation of Vehicle Control Device 9>

The vehicle controller 21 calculates the instruction steering angle θref using the model prediction control. In the present embodiment 3, the vehicle controller 21 solves an optimization problem having a limitation indicated by the following expression (11) every predetermined period, for example, every 100 milliseconds.

$$\left.\begin{array}{l}\min_{u} J\\ \text{s.t } \dot{x} = f(x, u)\\ x_0 = x(t)\\ g(x, u) \leq 0\end{array}\right\} \quad (11)$$

Herein, J is an evaluation function, x is a vehicle state quantity, u is a control input, f is a vector value function regarding a dynamic vehicle model, x0 is a vehicle state quantity at a time t, and g is a function regarding a limitation condition.

The optimization problem having the limitation indicated by the above expression (11) is equivalent to a maximization problem by inverting a sign of the evaluation function. Thus, a minimization problem is described hereinafter, however, the maximization problem is also applicable.

In the present embodiment, the vehicle state quantity x and the control input u are set as the following expressions (12) and (13).

$$x = [x_{bc} y_{bc} \theta_{bc} \beta \gamma \delta]^T \quad (12)$$

$$u = s_\delta \quad (13)$$

Herein, $x_{bc}$ is an $x_b$ coordinate of the vehicle in the subject vehicle coordinate system, $y_{bc}$ is an $x_c$ coordinate of the vehicle 1 in the subject vehicle coordinate system, $\theta_{bc}$ is an orientation in the subject vehicle coordinate system, β is a sideslip angle, γ is a vehicle yaw rate, δ is a steering angle, and $s_\delta$ is a steering speed.

A two-wheel model indicated by the following expression (14) is used as the dynamic vehicle model.

$$\frac{dx}{dt} = \begin{bmatrix} V\cos(\theta_{bc} + \beta) \\ V\sin(\theta_{bc} + \beta) \\ \gamma \\ -\gamma + \frac{2}{MV}(Y_f + Y_r) \\ \frac{2}{I}(l_f Y_f - l_r Y_r) \\ s_\delta \end{bmatrix} \quad (14)$$

Herein, M is a vehicle mass, V is a vehicle speed, γ is a yaw rate, I is a yaw inertia moment, each of lf and lr is a distance from a barycenter of vehicle to front-rear wheels, and each of Yf and Yr is a cornering force of the front-rear wheels.

β≈0 can be satisfied in a normal traveling, thus Yf and Yr can be approximated as the following expressions (15) and (16) using cornering stiffness Cf and Cr of the front-rear wheels which is a unique value of the vehicle.

$$Y_f = -C_f\left(\beta + \frac{l_f}{V}\gamma - \delta\right) \quad (15)$$

$$Y_r = -C_r\left(\beta - \frac{l_r}{V}\gamma\right) \quad (16)$$

The dynamic vehicle model f is expressed as the following expression (17) using the above expressions (15) and (16).

$$\frac{dx}{dt} = f(x, u) = \begin{bmatrix} V\cos(\theta_{bc} + \beta) \\ V\sin(\theta_{bc} + \beta) \\ \gamma \\ -\left(1 + \frac{2(C_f l_f - C_r l_r)}{MV^2}\right)\gamma - \\ \frac{2}{MV}(C_f + C_r)\beta + \frac{2C_f}{MV}\delta \\ -\frac{2}{IV}(C_f l_f^2 + C_r l_r^2)\gamma - \\ \frac{2}{I}(C_f l_f - C_r l_r)\beta + \frac{2}{I}C_f l_f \delta \\ s_\delta \end{bmatrix} \quad (17)$$

In the present embodiment 3, the following expression (18) is used as the evaluation function J.

$$J = x_f^T P x_f + \int_t^{\tau+T_h} \left[ \sum_p^{N_p} \{(z-z_p)^T \Omega_p (z-z_p)\} + x^T Q x + r \cdot s_\delta^2 \right] d\tau \quad (18)$$

Herein, t is a current time, Th is a horizon, τ is a time in the horizon, xf is a vehicle state quantity at a time t+T, p is an index expressing a traveling route p, and Np is a total number of the traveling routes.

z in the evaluation function J is a vector collecting $y_{bc}$ and the yaw angle $\theta_{bc}$ in the vehicle state predicted in the time τ in the horizon, that is to say, $z=[y_{bc}, \theta_{bc}]^T$, and $z_p$ is a vector collecting $y_{bc}$ and the angle $\theta_{bp}$ in $x_{bc}$ of the traveling route p, that is to say, $z_p=[y_{bp}, \theta_{bp}]^T$.

Herein, when the traveling route p is expressed by a cubic polynomial, the traveling route is obtained by the following expressions (19) and (20).

$$x_{bp} = C_{p3} \cdot x_{bc3} + C_{p2} \cdot x_{bc2} + C_{p1} \cdot x_{bc} + C_{p0} \quad (19)$$

$$\theta_{bp} = \tan^{-1}(3 \cdot C_{p3} \cdot x_{bc}^2 + 2 \cdot C_{p2} \cdot x_{bc} + C_{p1}) \quad (20)$$

$\Omega_p$ obtained in a weight generation means of the traveling route is a matrix in which weight is arranged diagonally to the traveling route p, and is set by the following expression (21) when the weight of the traveling route p is $\omega_p$.

$$\Omega_p = \begin{bmatrix} \omega_p & 0 \\ 0 & \omega_p \end{bmatrix} \quad (21)$$

In the evaluation function J, $$\sum_p^{N_p} \{(z-z_p)^T \Omega_p (z-z_p)\}$$

the above term is weighted by $\Omega_p$ for each predicted position, orientation, and travel route p of the vehicle and evaluated.

Accordingly, even when the deviation from the traveling route with small weight is large, there is little influence on the output of the evaluation function J is, and the output of the evaluation function J gets large with increase in the deviation from the traveling route with large weight, thus performed is the steering control to follow the traveling route with the large weight as closely as possible.

Q is a matrix in which a vehicle state quantity having a value to be suppressed is set, and a diagonal matrix is normally set. That is to say, Q with respect to the vehicle state quantity x is set by the following expression (22).

$$Q = \begin{bmatrix} q_1 & 0 & 0 & 0 & 0 \\ 0 & q_2 & 0 & 0 & 0 \\ 0 & 0 & q_3 & 0 & 0 \\ 0 & 0 & 0 & q_4 & 0 \\ 0 & 0 & 0 & 0 & q_5 \end{bmatrix} \quad (22)$$

Herein, each of $q_1$ to $q_5$ is a constant for each state quantity. When this value is made large for each state quantity, the influence on the evaluation function J gets large, thus the steering control is performed so that the magnitude of the corresponding variable is suppressed.

r is a constant for a magnitude of the steering speed $s_\delta$. When a value of r is made large, the influence on the evaluation function J gets large, thus the steering control is performed so that the magnitude of the control input is suppressed.

Next, a vector value function g regarding the limitation condition is described. The function g is used for setting an upper and lower limit value of the vehicle state quantity x and the control input u in the optimization problem having the limitation, and the optimization is executed under a condition of g(x, u)≤0.

In the present embodiment 3, the limitation condition is set as follows. That is to say, the vector value function g indicated by the following expression (23) is set under a condition that an upper limit value of the steering speed $s_\delta$ is $s_{\delta\ max}$ (>0), a lower limit value of the steering speed $s_\delta$ is $s_{\delta mix}$ (<0), an upper limit value of the yaw rate γ is $\gamma_{max}$ (>0), a lower limit value of the yaw rate γ is $\gamma_{mix}$ (<0), an upper limit value of the steering angle δ is $\delta_{max}$ (>0), and a lower limit value of the steering angle δ is $\delta_{mix}$ (<0).

$$g = \begin{bmatrix} s_\delta - s_{\delta max} \\ s_\delta - s_{\delta min} \\ \beta - \beta_{max} \\ \beta + \beta_{\delta min} \\ \gamma - \gamma_{max} \\ \gamma + \gamma_{min} \\ \delta - \delta_{max} \\ \delta + \delta_{min} \end{bmatrix} \quad (23)$$

As described above, when the vector value function g is set, the steering speed $s_\delta$, the slip angle β, the yaw rate γ, and the steering angle δ are optimized under the set upper and lower limit values.

The upper and lower limit values of the slip angle β, the yaw rate γ, and the steering angle δ are set, thus a dangerous vehicle motion can be prevented. The upper and lower limit value of the steering speed $s_\delta$ is set, thus the steering control with comfortableness can be performed.

As described above, according to the present embodiment 3, the weight of the control target range is set larger than that of the range other than the control target range and is approximated in the configuration of performing the steering control using the predetermined range or the plurality of point groups such as the model prediction control, thus the following capability of the vehicle following the traveling route can be further improved, and safety and comfortableness regarding the traveling of the vehicle can be improved.

In the present embodiment 3, the limitation condition is set, however, the limitation condition may not be set. That is to say, also applicable is a configuration of not defining the vector value function g. In this case, there is no limitation condition, thus an infeasible solution in the optimization problem is not output, and the optimization can be stably calculated.

According to the present invention, each embodiment can be arbitrarily combined, or each embodiment can be appropriately varied or omitted within the scope of the invention.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS

1 vehicle, 2 vehicle wheel, 3 handle, 4 steering device, 5 satellite, 6 position detection device, 7 map distribution device, 8 vehicle speed sensor, 9 vehicle control device, 10 antenna, 11 traveling route generation device, 12 vehicle position information acquisition unit, 13 road information acquisition unit, 14 vehicle information acquisition unit, 15 travel region information acquisition unit, 16 traveling route generation unit, 17 processor, 18 memory, 19 traveling route information acquisition unit, 20 vehicle information acquisition unit, 21 vehicle controller, 22 processor, 23 memory.

The invention claimed is:

1. A traveling route generation device, comprising:
a processor to execute a program, and
a memory to store the program which, when executed by the processor, performs processes of,
a travel region information acquisition process acquiring travel region information which is information of a region where a vehicle travels and includes point group information which is a group of a plurality of positions along a road; and
a traveling route generation process generating information of a curved line expressing a route along which the vehicle should proceed by approximating the point group information included in the travel region information to a curved line, wherein
the information of the curved line is supplied to a vehicle controller of a vehicle control device performing steering control of the vehicle,
the traveling route generation process comprises increasing weight of the point group information included in the travel region information in a range used for the steering control in the travel region information to be larger than weight of the point group information included in the travel region information in a range which is not used for the steering control to generate the information of the curved line, and
the range which is not used for the steering control is the point group information before and after the range used for the steering control.

2. The traveling route generation device according to claim 1, wherein the program, when executed by the processor, further performs processes of,
a vehicle position information acquisition process acquiring current position information of the vehicle;
a road information acquisition process acquiring road information including point group information which is a group of a plurality of positions along a road; and
a vehicle information acquisition process acquiring vehicle information including at least speed information of the vehicle, wherein
the travel region information acquisition process comprises acquiring the travel region information based on the current position information, the point group information, and the vehicle information, and
the traveling route generation process comprises determining a reference range, which indicates a range of the point group information referenced when the information of the curved line is generated, based on the current position information, the point group information, and the vehicle information, and increasing weight of a control reference point corresponding to a position used for the steering control in the point group information to be larger than weight of a point other than the control reference point which is not used for the steering control in the reference range to generate the information of the curved line.

3. The traveling route generation device according to claim 2, wherein
the control reference point is located in front of the vehicle, and is determined in accordance with the speed information.

4. The traveling route generation device according to claim 2, wherein
the control reference point is a barycentric position of the vehicle.

5. The traveling route generation device according to claim 2, wherein
the control reference point is a dot sequence, and
the traveling route generation process comprises increasing weight of the control reference point which is a dot sequence to be larger than weight of a point other than the control reference point in the reference range to generate the information of the curved line.

6. The traveling route generation device according to claim 2, wherein
the traveling route generation process comprises determining a range from a current position of the vehicle to a position calculated by multiplying a speed of the vehicle by a predetermined time as the reference range.

7. The vehicle control device according to claim 1, comprising:
a traveling route information acquisition process acquiring the information of the curved line generated by the traveling route generation process; and
the vehicle control process performing steering control of the vehicle so that the vehicle travels along the route along which the vehicle should proceed based on the information of the curved line acquired by the traveling route information acquisition process.

8. The vehicle control device according to claim 2, comprising:
a traveling route information acquisition unit (19) process acquiring the information of the curved line generated by the traveling route generation process; and
the vehicle control process performing steering control of the vehicle so that the vehicle travels along the route along which the vehicle should proceed based on the information of the curved line acquired by the traveling route information acquisition process, wherein
the vehicle control process comprises performing the steering control using at least one of a curvature of the curved line in the control reference point, a distance from the control reference point to the curved line, and an angle between a vector of the curved line and a speed vector of the vehicle in the control reference point.

9. The vehicle control device according to claim 2, comprising:
a traveling route information acquisition process acquiring the information of the curved line generated by the traveling route generation process; and
the vehicle control process performing steering control of the vehicle so that the vehicle travels along the route along which the vehicle should proceed based on the information of the curved line acquired by the traveling route information acquisition process, wherein
the vehicle control process comprises performing the steering control based on an evaluation function using at least one of a distance from the control reference point to the curved line and an angle between a vector of the curved line and a speed vector of the vehicle in the control reference point.

* * * * *